United States Patent
Kim et al.

(10) Patent No.: US 12,312,008 B2
(45) Date of Patent: May 27, 2025

(54) PLASTIC COMPOSITE MATERIAL PANEL AND MANUFACTURING METHOD THEREOF

(71) Applicants: Hyundai Motor Company, Seoul (KR); Kia Corporation, Seoul (KR)

(72) Inventors: Minsoo Kim, Suwon-si (KR); Jung Jong Chun, Seoul (KR); Chulhee Heo, Hwaseong-si (KR); Seokju Gim, Seongnam-si (KR); Joonghyun Shin, Hwaseong-si (KR); Woojin Kim, Seongnam-si (KR); Hyuncheol Yun, Seoul (KR); Hyunyi Kwon, Ulsan (KR); Sea Cheoul Song, Suwon-si (KR); Heedae Oh, Suwon-si (KR); Jai Hak Kim, Gunpo-si (KR); Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 280 days.

(21) Appl. No.: 17/957,301

(22) Filed: Sep. 30, 2022

(65) Prior Publication Data
US 2023/0021941 A1 Jan. 26, 2023

Related U.S. Application Data (63) Continuation-in-part of application No. 17/468,000, filed on Sep. 7, 2021, now Pat. No. 11,760,419.

(30) Foreign Application Priority Data

Jan. 11, 2021 (KR) .......................... 10-2021-0003308
Nov. 22, 2021 (KR) .......................... 10-2021-0161014

(51) Int. Cl.
*B62D 25/06* (2006.01)
*B29C 65/00* (2006.01)
(Continued)

(52) U.S. Cl.
CPC .............. *B62D 25/06* (2013.01); *B29C 65/48* (2013.01); *B29C 66/721* (2013.01); *B29C 70/46* (2013.01);
(Continued)

(58) Field of Classification Search
CPC ........ B62D 25/02; B62D 25/00; B62D 25/04; B62D 25/06; B62D 29/043; B62D 29/048; B62D 29/001; B62D 4/06
(Continued)

(56) References Cited

U.S. PATENT DOCUMENTS 5,988,074 A * 11/1999 Thoman ............... B61D 17/005
                                                          105/396
8,172,308 B2 * 5/2012 Schmidt ............... B62D 33/046
                                                          296/181.3
(Continued)

FOREIGN PATENT DOCUMENTS

CN        107010119 A      8/2017
CN        208360178 U  *   1/2019  ............. B61D 17/12
(Continued)

OTHER PUBLICATIONS

CN208360178 Text (Year: 2019).*
(Continued)

*Primary Examiner* — Dennis H Pedder
(74) *Attorney, Agent, or Firm* — Slater Matsil, LLP (57) ABSTRACT

A plastic composite material panel includes a roof plate portion adhesively bonded to a first bonding portion provided in a vehicle body frame. A roof extension portion extends from an edge of the roof plate portion and is adhesively bonded to a second bonding portion provided in the vehicle body frame.

20 Claims, 10 Drawing Sheets

(51) Int. Cl.
  *B29C 65/48* (2006.01)
  *B29C 70/46* (2006.01)
  *B62D 27/00* (2006.01)
  *B62D 27/02* (2006.01)
  *B62D 29/04* (2006.01)
  *B29K 105/00* (2006.01)
  *B29L 31/30* (2006.01)

(52) U.S. Cl.
  CPC ......... *B62D 27/026* (2013.01); *B62D 29/043* (2013.01); *B29K 2105/0061* (2013.01); *B29L 2031/30* (2013.01)

(58) Field of Classification Search
  USPC .... 296/193.05, 203.01–203.04, 901.01, 191, 296/193.06, 210
  See application file for complete search history.

(56) References Cited

U.S. PATENT DOCUMENTS

| | | | |
|---|---|---|---|
| 8,511,742 | B2 | 8/2013 | Legler et al. |
| 11,208,151 | B2 * | 12/2021 | Dominic ................ B62D 25/02 |
| 2016/0318557 | A1 | 11/2016 | Kim et al. |

FOREIGN PATENT DOCUMENTS

| | | | | | |
|---|---|---|---|---|---|
| CN | 110696926 | A | | 1/2020 | |
| DE | 3124975 | A | * | 1/1983 | ........... B62D 29/048 |
| JP | 62018369 | A | * | 1/1987 | |
| JP | S62194980 | A | * | 8/1987 | |
| JP | 2009220651 | A | | 10/2009 | |
| JP | 2016210398 | A | | 12/2016 | |

OTHER PUBLICATIONS

DE2124975 Text (Year: 1983).*
JP62018369 Text (Year: 1987).*
JP62-194980 Text (Year: 1987).*

* cited by examiner

PLASTIC COMPOSITE MATERIAL PANEL AND MANUFACTURING METHOD THEREOF

CROSS-REFERENCE TO RELATED APPLICATIONS

This application claims priority to and the benefit of Korean Patent Application No. 10-2021-0161014 filed in the Korean Intellectual Property Office on Nov. 22, 2021 and is also a continuation-in-part of U.S. patent application Ser. No. 17/468,000 filed on Sep. 7, 2021, which claims priority to and the benefit of Korean Patent Application No. 10-2021-0003308 filed in the Korean Intellectual Property Office on Jan. 11, 2021. Each of these applications are incorporated herein by reference in their entirety.

TECHNICAL FIELD

An embodiment of the present invention relates to a plastic composite material panel and a method of manufacturing a plastic composite material panel.

BACKGROUND

Recently, the vehicle industry has been introducing a new concept of future mobility vision for realizing a human-centered and dynamic future city. One of these future mobility solutions is a PBV vehicle as purpose-based mobility.

The PBV vehicle is an environment-friendly mobility solution that provides a customized service for passengers during a period in which they travel on the ground to their destination, and it may use an electric vehicle (EV)-based artificial intelligence to set an optimal route for each situation and may also group-drive.

A vehicle body of the PBV vehicle includes an underbody (referred to as a rolling chassis or skateboard in the art) and an upper body mounted on the under body.

Typically, the upper body includes a vehicle body frame made of a steel material, and a plurality of outer panels made of a steel material assembled to the vehicle body frame. In recent years, in order to reduce the weight of the vehicle body, the plurality of outer panels made of a steel material have been replaced with a plurality of plastic composite material panels.

The plurality of plastic composite material panels are manufactured by molding the plastic composite original material into a shape set through a mold. The plurality of plastic composite material panels may be coupled to the vehicle body frame with bolts and nuts, or with adhesive.

However, in order to apply the plurality of plastic composite material panels to the vehicle body frame, it is necessary to minimize an application area of the plurality of plastic composite material panels to reduce cost and simplify an assembly process thereof.

Furthermore, according to the conventional art, as a bent shape portion (undercut portion) of the plurality of plastic composite material panels is caught in a molding portion of the mold, the plurality of plastic composite material panels may not be smoothly taken out from the mold.

The above information disclosed in this Background section is only for enhancement of understanding of the background of the invention, and therefore it may contain information that does not form the prior art that is already known in this country to a person of ordinary skill in the art.

SUMMARY

An embodiment of the present invention relates to a plastic composite material panel. Particular embodiments relates to a plastic composite material panel that is bonded to a vehicle body of a purpose built vehicle (PBV) and a manufacturing method thereof.

Embodiments of the present invention can provide a plastic composite material panel that may minimize an application area of a plurality of outer panels made of a plastic composite material assembled to a vehicle body frame.

In addition, embodiments of the present invention can provide a manufacturing method of a plastic composite material panel that may increase moldability of the plastic composite material panel.

An embodiment of the present invention provides a plastic composite material panel. The panel includes a roof plate portion bonded to a first bonding portion provided in a vehicle body frame through an adhesive and a roof extension portion that extends from an edge of the roof plate portion and is bonded to a second bonding portion provided in the vehicle body frame through an adhesive.

The plastic composite material panel may further include a first material filling portion formed at an end of the roof extension portion.

The roof extension portion may extend from both side edges of the roof plate portion in a front-rear direction of a vehicle body to a side of the vehicle body frame.

The first material filling portion may be provided to have a shape having a cross-sectional width being gradually decreased from an upper side to a lower side.

The roof plate portion may include a second material filling portion formed under an edge thereof and bonded to the first bonding portion through an adhesive.

The roof extension portion may include a third material filling portion formed under an edge thereof and bonded to the second bonding portion through an adhesive.

The roof extension may further include a vehicle body seating portion formed between the second material filling portion and the third material filling portion with a smaller thickness than that of the second material filling portion and the third material filling portion.

The second material filling portion, in the vehicle body frame including a roof side or a side outer panel of a steel material coupled to the roof side, may be bonded to the first bonding portion provided on one of the roof side and the side outer panel of the steel material.

The third material filling portion, in the vehicle body frame including a side outer panel of a steel material coupled to a roof side or a side outer panel of a plastic composite material coupled to the roof side, may be bonded to the second bonding portion provided on one of the side outer panel of the steel material and the side outer panel of the plastic composite material.

Thicknesses of the second material filling portion and the third material filling portion may be greater than a thickness of the vehicle body seating portion, and may be changed according to heights of the first bonding portion and the second bonding portion.

The vehicle body seating portion may be seated on a protrusion portion protruding upward from the vehicle body frame.

The plastic composite material panel may further include at least one position determining pin provided under a front edge or rear edge of the roof plate portion and vertically inserted into a reference hole formed in the vehicle body frame.

The plastic composite material panel may further include at least one insert bolt provided under a front edge or rear edge of the roof plate portion and fastened to a fastening hole formed in the vehicle body frame.

Another embodiment of the present invention provides a manufacturing method of the plastic composite material panel. A gel type of plastic composite material is loaded on a fixed die having a first molding surface configured to mold a roof plate portion and a second molding surface configured to mold a roof extension portion. A movable die in which a first molding groove configured to mold a first material filling portion, a second molding groove configured to mold a second material filling portion, and a third molding groove configured to mold a third material filling portion are formed along a vertical direction with the fixed die are combined. A plastic composite material panel in which the roof plate portion including the second material filling portion is formed by the first molding surface and the second molding groove and the roof extension portion including the first material filling portion and the third material filling portion is formed by the second molding surface, the first molding groove, and the third molding groove are molded.

The manufacturing method of the plastic composite material panel may further include releasing the movable die from the fixed die in an upward direction, and taking out the plastic composite material panel in the upward direction.

According to the embodiments of the present invention, since it is possible to minimize an application portion of a plurality of outer panels made of a plastic composite material assembled to a side assembly of a vehicle body frame, it is possible to reduce cost and to simplify the assembly process thereof.

In addition, effects that may be obtained or expected from embodiments of the present invention are directly or suggestively described in the following detailed description. That is, various effects expected from embodiments of the present invention will be described in the following detailed description.

BRIEF DESCRIPTION OF THE DRAWINGS

These drawings are for reference only in describing embodiments of the present invention, and therefore, the technical idea of the present invention should not be limited to the accompanying drawings.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

Further, in the following detailed description, terms of elements, which are in the same relationship, are divided into "the first", "the second", etc., but the present invention is not necessarily limited to the order in the following description.

Throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", " . . . portion", and " . . . member" described in the specification mean a unit of a comprehensive configuration having at least one function or operation.

Figure 1:
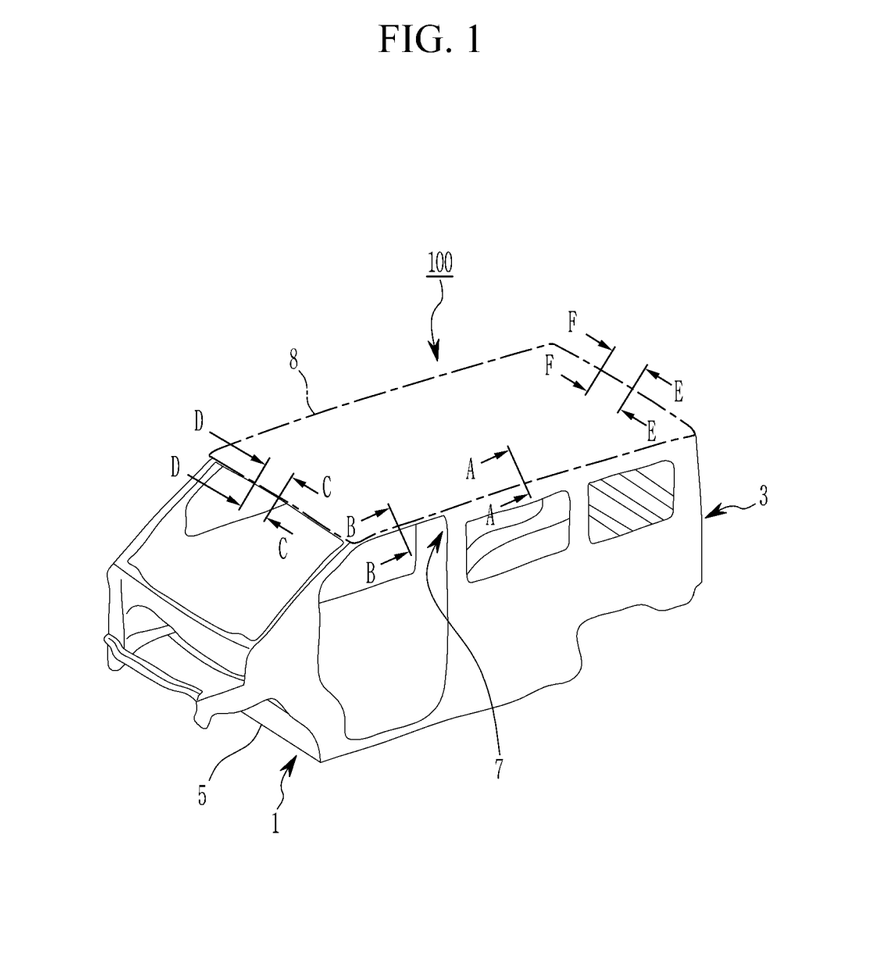
FIG. 1 illustrates an example of a vehicle body applied to an embodiment of the present invention.

FIG. 1 illustrates an example of a vehicle body applied to an embodiment of the present invention.

Referring to FIG. 1, a plastic composite material panel 100 according to an embodiment of the present invention may be applied to a vehicle body of, for example, an electric vehicle-based purpose built vehicle (PBV).

Here, the PBV may be an environment-friendly vehicle that provides a customized service required for an occupant during a time it takes to travel on the ground to a destination. The PBV may set the optimal path for each situation, enable group driving, and furthermore, may be a box-type of vehicle with a large interior space.

The vehicle body of the PBV may include an under body 1 of a skateboard type and an upper body 3 mounted on the under body 1.

The under body 1 is also referred to as a rolling chassis in the art, and may include a chassis frame 5 on which a battery assembly (not shown in the drawing) may be mounted.

In addition, the upper body 3 is a body coupled onto the under body 1, and may include a vehicle body frame 7 forming a cabin.

In the art, a vehicle width direction (full width direction) is referred to as an L direction, a vehicle body length direction (front/rear direction or full length direction of a vehicle body) is referred to as a T direction, and a height direction of a vehicle body is referred to as an H direction. However, in the embodiment of the present invention, instead of setting the L, T, and H directions as described above as the reference directions, the following constituent elements will be described by setting the reference directions to a vehicle width direction, a vehicle body front/rear direction, and a vertical direction.

In addition, hereinafter, an end (one end or the other end) may be defined as any one end, or may be defined as a predetermined portion (one end portion or the other end portion) including the end.

Meanwhile, the vehicle body frame 7 of the upper body 3 may include a side assembly assembled to the chassis frame 5 of the under body 1 and a roof assembly assembled to the side assembly.

The plastic composite material panel 100 according to the embodiment of the present invention is bonded to the vehicle body frame 7.

The plastic composite material panel 100 according to the embodiment of the present invention is a reinforcement material impregnated with a resin in a fiber material, and may be molded into a predetermined shape by a mold.

Furthermore, the plastic composite material panel 100 according to the embodiment of the present invention may include one of a fiber reinforced plastic (FRP), a carbon fiber reinforced plastic (CFRP), and a glass fiber reinforced plastic (GFRP).

Furthermore, the plastic composite material panel 100 according to the embodiment of the present invention may be configured of a roof panel 8 bonded to the roof assembly of the vehicle body frame 7 through an adhesive. Here, an outer panel made of a steel material and a plurality of outer panels made of a plastic composite material may be assembled to the side assembly of the body frame 7.

The plastic composite material panel 100 according to the embodiment of the present invention described above may minimize the application portion of the plurality of outer panels of the plastic composite material assembled to the side assembly of the vehicle body frame 7, and may have a structure with good moldability.

Figure 2:
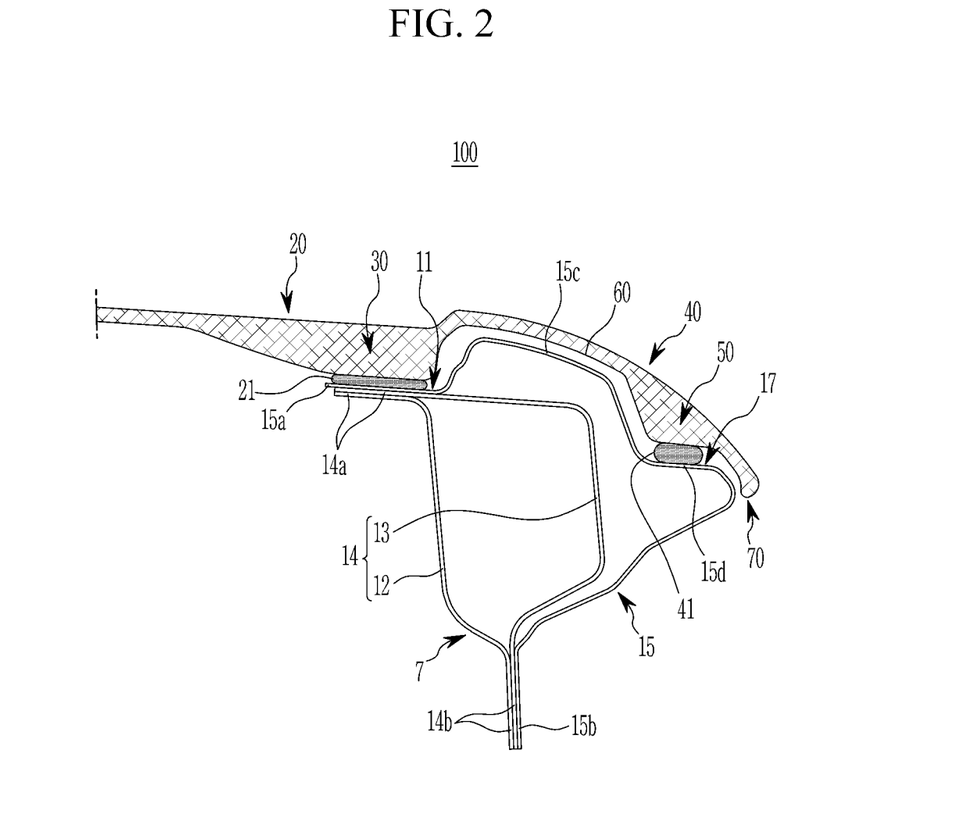
FIG. 2 illustrates a cross-sectional view taken along line A-A of FIG. 1 illustrating an assembly structure of a plastic composite material panel according to an embodiment of the present invention.

FIG. 2 illustrates a cross-sectional view taken along line A-A of FIG. 1 illustrating the assembly structure of the plastic composite material panel according to the embodiment of the present invention.

Referring to FIG. 2, the plastic composite material panel 100 according to the embodiment of the present invention includes a roof plate portion 20, a roof extension portion 40, and a first material filling portion 70.

In the embodiment of the present invention, the roof plate portion 20 is provided as a plate having a flat upper surface, and is bonded to the vehicle body frame 7 through an adhesive 21. The roof plate portion 20 may be bonded to a bonding portion 11 provided in the vehicle body frame 7.

For this purpose, the roof plate portion 20 includes a second material filling portion 30. The second material filling portion 30 may be formed under an edge of the roof plate portion 20, and may be bonded to the first bonding portion 11 through an adhesive 21. The second material filling portion 30 is formed thicker than the inside of the edge of the roof plate portion 20.

Meanwhile, the vehicle body frame 7 may include a first roof side 14 made of a steel material to which a first roof side inner panel 12 and a first side outer reinforcement panel 13 are bonded.

The first roof side inner panel 12 and the first side outer reinforcement panel 13 may be press-molded into a predetermined shape by a press molding method that is well known to those skilled in the art.

The first roof side 14 may be formed to have a closed cross-section by the first roof side inner panel 12 and the first side outer reinforcement panel 13 bonded to each other.

Here, the first roof side inner panel 12 and the first side outer reinforcement panel 13 may be bonded to each other through a first upper bonding flange 14a and a first lower bonding flange 14b.

In addition, the vehicle body frame 7 further includes a side outer panel 15 made of a steel material bonded (coupled) to the first roof side 14.

Here, the side outer panel 15 made of the steel material includes a second upper bonding flange 15a and a second lower bonding flange 15b that are respectively bonded to the first upper bonding flange 14a and the first lower bonding flange 14b of the first roof side 14. In addition, the side outer panel 15 made of the steel material includes a first protrusion portion 15c protruding in the upper direction and a second protrusion portion 15d protruding in the vehicle width direction.

In the vehicle body frame 7 described above, the first bonding portion 11 is provided in the side outer panel 15 made of the steel material. Furthermore, the first bonding portion 11 may include a second upper bonding flange 15a of the side outer panel 15 made of the steel material.

The second material filling portion 30 as described above is bonded to the second upper bonding flange 15a of the side outer panel 15 made of the steel material through the adhesive 21.

In the embodiment of the present invention, the roof extension portion 40 extends outward from the edge of the roof plate portion 20.

In one example, the roof extension portion 40 is provided as a curved parting portion in a round shape, and is bonded to the vehicle body frame 7 through an adhesive 41.

In another example, the roof extension portion 40 may extend from both side edges along the vehicle body front-rear direction of the roof plate portion 20 to the side assembly side of the vehicle body frame 7, respectively.

The roof extension portion 40 may be bonded to the second bonding portion 17 provided on the vehicle body frame 7 through the adhesive 41.

The roof extension portion 40 includes a third material filling portion 50 and a vehicle body seating portion 60.

The third material filling portion 50 may be formed under an edge of the roof extension portion 40, and may be bonded to the second bonding portion 17 through the adhesive 41. The third material filling portion 50 is formed to be thicker than an inner edge of the roof extension portion 40.

Here, the second bonding portion 17 is provided on the side outer panel 15 of the steel material in the vehicle body frame 7. Furthermore, the second bonding portion 17 may include a second protrusion portion 15d of the side outer panel 15 made of the steel material.

The third material filling portion 50 as described above is bonded to the second protrusion portion 15d of the side outer panel 15 made of the steel material through the adhesive 41.

The vehicle body seating portion 60 is formed between the second material filling portion 30 of the roof plate portion 20 and the third material filling portion 50 of the roof extension portion 40. The vehicle body seating portion 60 is formed to have a smaller thickness than the second material filling portion 30 and the third material filling portion 50, and is formed in a form of a groove between the second material filling portion 30 and the third material filling portion 50.

Here, thicknesses of the second material filling portion 30 and the third material filling portion 50 may be larger than a thickness of the vehicle body seating portion 60, and may vary depending on heights of the first bonding portion 11 and the second bonding portion 17 mentioned above.

Furthermore, the vehicle body seating portion 60 may be seated along the vertical direction on the first protrusion portion 15*c* of the side outer panel 15 of the steel material provided in the vehicle body frame 7.

As the vehicle body seating portion 60 is seated on the first protrusion portion 15*c* of the vehicle body frame 7 as described above, the plastic composite material panel 100 according to the embodiment of the present invention may be correctly positioned at a predetermined position of the vehicle body frame 7.

That is, when the plastic composite material panel 100 is loaded on the vehicle body frame 7, the vehicle body seating portion 60 is seated on the first protrusion portion 15*c*, and the first protrusion portion 15*c* serves as a stopper for holding the plastic composite material panel 100 through the vehicle body mounting portion 60.

Accordingly, the first protrusion portion 15*c* may prevent the plastic composite material panel 100 from separating from the vehicle body frame 7 when the plastic composite material panel 100 is assembled.

In addition, as the plastic composite material panel 100 is loaded in the vehicle body frame 7 in the vertical direction by the first protrusion portion 15*c* as described above, the adhesives 21 and 41 applied to the second material filling portion 30 and the third material filling portion 50 are not collected to one side.

In the embodiment of the present invention, the first material filling portion 70 is intended to improve the moldability of the plastic composite material panel 100 by the mold. The first material filling portion 70 is formed at an end portion of the roof extension portion 40. That is, the first material filling portion 70 is formed in an undercut portion of the end portion of the roof extension portion 40.

The first material filling portion 70 is provided to have a rounded shape in a planar portion of the roof extension portion 40. Furthermore, the first material filling portion 70 may be provided to have a shape in which a cross-sectional width thereof gradually decreases from an upper side to a lower side.

Figure 3:
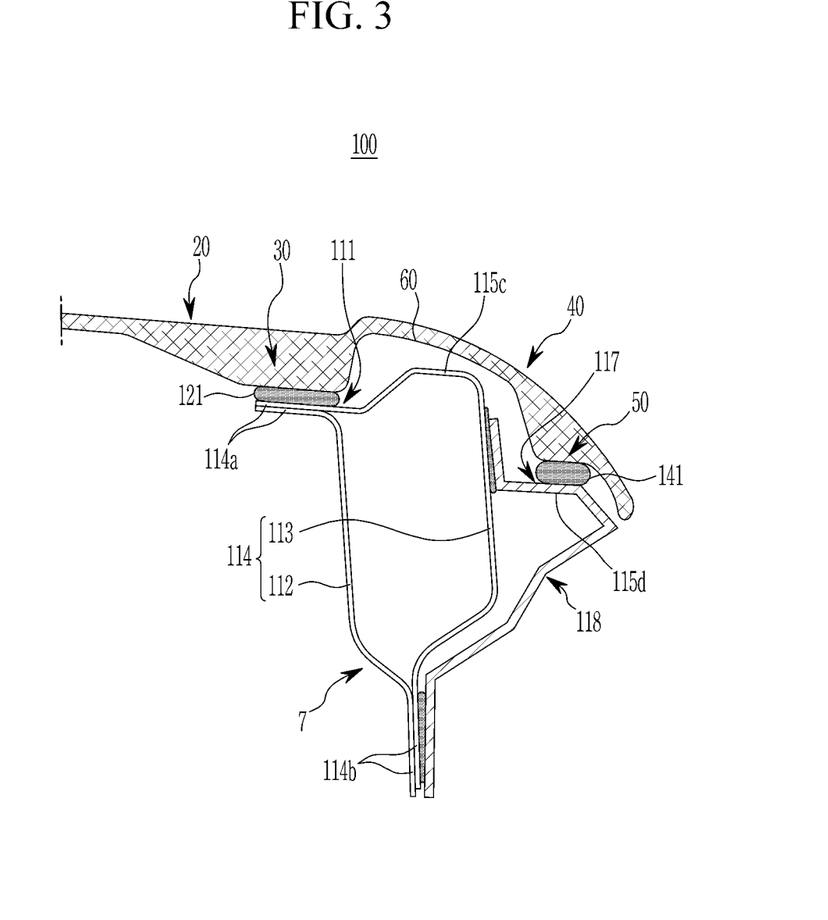
FIG. 3 illustrates a cross-sectional view taken along line B-B of FIG. 1 illustrating an assembly structure of a plastic composite material panel according to an embodiment of the present invention.

FIG. 3 illustrates a cross-sectional view taken along line B-B of FIG. 1 illustrating the assembly structure of the plastic composite material panel according to the embodiment of the present invention.

Referring to FIG. 3, the plastic composite material panel 100 according to the embodiment of the present invention may be bonded to a first bonding portion 111 and a second bonding portion 117 provided in the vehicle body frame 7 through adhesives 121 and 141.

The first bonding portion 11 is provided at a second roof side 114 molded by a blow forming method that is well known to those skilled in the art. The second roof side 114 includes a second roof side inner panel 112 and a second side outer reinforcement panel 113 bonded to each other. The second roof side 114 may be formed to have a closed cross-section by the second roof side inner panel 112 and the second side outer reinforcement panel 113 bonded to each other.

The second roof side inner panel 112 and the second side outer reinforcement panel 113 may be bonded to each other through a third upper bonding flange 114*a* and a third lower bonding flange 114*b*.

Here, the first bonding portion 11 may include the third upper bonding flange 114*a* of the second roof side 114. In addition, a third protrusion portion 115*c* protruding in the upper direction is formed on the second side outer reinforcement panel 113.

The second bonding portion 117 is provided on a side outer panel 118 of the plastic composite material bonded (coupled) to the second roof side 114. A fourth protrusion portion 115*d* protruding in the vehicle width direction is formed on the side outer panel 118 of the plastic composite material.

The second bonding portion 117 may include the fourth protrusion portion 115*d* of the side outer panel 118 of the plastic composite material.

Accordingly, the second material filling portion 30 of the roof plate portion 20 is bonded to the third upper bonding flange 114*a* of the second roof side 114 through the adhesive 121. In addition, the third material filling portion 50 of the roof extension portion 40 is bonded to the fourth protrusion portion 115*d* of the side outer panel 118 of the plastic composite material through the adhesive 141.

Furthermore, the vehicle body seating portion 6*o* between the second material filling portion 30 and the third material filling portion 50 is seated on the third protrusion portion 115*c* of the second side outer reinforcement panel 113.

Figure 4:
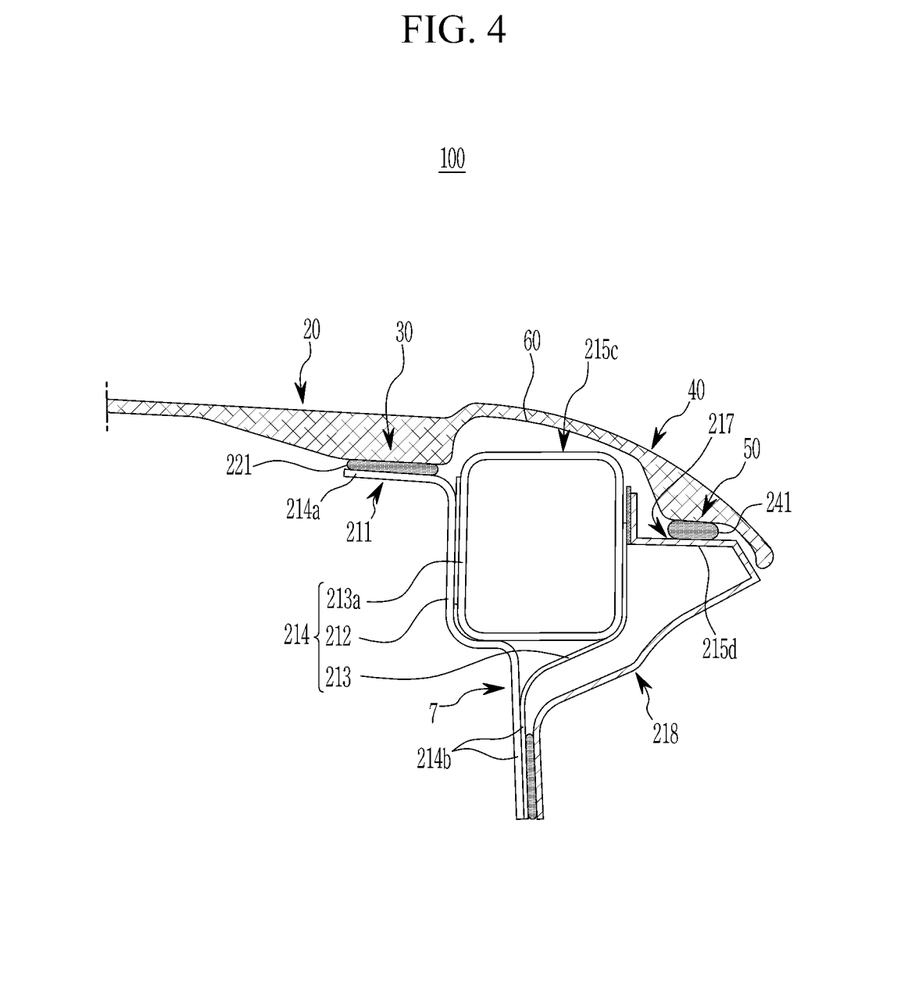
FIG. 4 illustrates a cross-sectional view of another example of an assembly structure of a plastic composite material panel according to an embodiment of the present invention.

FIG. 4 illustrates a cross-sectional view of another example of the assembly structure of the plastic composite material panel according to the embodiment of the present invention.

Referring to FIG. 4, the plastic composite material panel 100 according to the embodiment of the present invention may be bonded to a first bonding portion 211 and a second bonding portion 217 provided in the vehicle body frame 7 through adhesives 221 and 241.

The first bonding portion 211 is provided at a third roof side 214. The third roof side 214 includes a third roof side inner panel 212, a third side outer reinforcement panel 213, and a reinforcement member 213*a*.

The third roof side inner panel 212 and the third side outer reinforcement panel 213 are bonded to each other through a fourth lower bonding flange 214*b*. In addition, a fourth upper bonding flange 214*a* is formed on the third roof side inner panel 212.

In addition, the reinforcement member 213*a* is disposed between the third roof side inner panel 212 and the third side outer reinforcement panel 213. In one example, the reinforcement member 213*a* may be provided in a form of a tube having a quadrangular closed cross-section.

The reinforcement member 213*a* is bonded to the third roof side inner panel 212 and the third side outer reinforcement panel 213, and between the third roof side inner panel 212 and the third side outer reinforcement panel 213.

The first bonding portion 211 may include the fourth upper bonding flange 214*a* of the third roof side 214. In addition, a fifth protrusion portion 215C protruding in the upper direction is formed on the reinforcing member 213*a*.

The second bonding portion 217 is provided on a side outer panel 218 of the plastic composite material bonded (coupled) to the third roof side 214. A sixth protrusion portion 215*d* protruding in the vehicle width direction is formed on the side outer panel 218 of the plastic composite material.

The second bonding portion 217 may include the sixth protrusion portion 215*d* of the side outer panel 218 of the plastic composite material.

Accordingly, the second material filling portion 30 of the roof plate portion 20 is bonded to the fourth upper bonding flange 214*a* of the third roof side 214 through the adhesive 221. In addition, the third material filling portion 50 of the roof extension portion 40 is bonded to the sixth protrusion portion 215*d* of the side outer panel 218 of the plastic composite material through the adhesive 241.

Furthermore, the vehicle body seating portion 60 between the second material filling portion 30 and the third material filling portion 50 is seated on the fifth protrusion portion 215C of the reinforcement member 213*a*.

Hereinafter, a manufacturing method of the plastic composite material panel 100 according to the embodiment of the present invention configured as described above will be described in detail with reference to FIG. 5 and FIG. 6.

Figure 5:
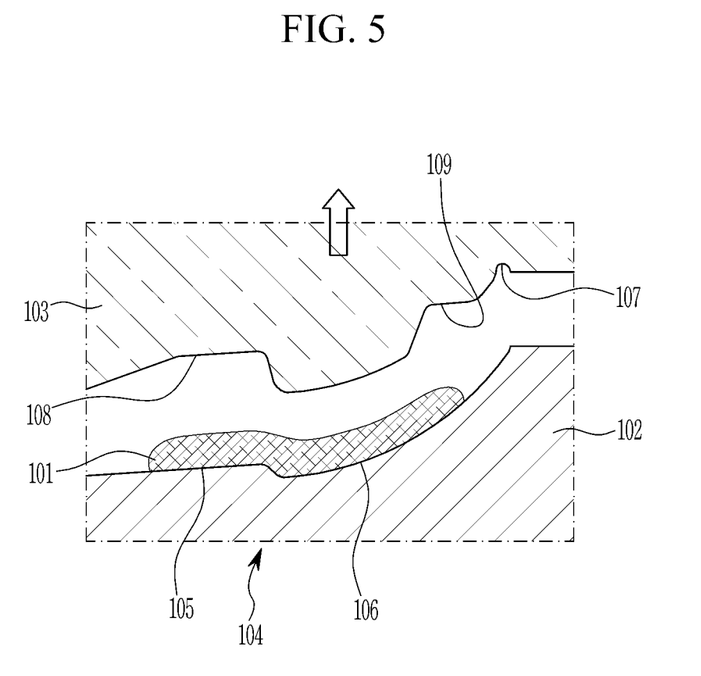
FIG. 5 and FIG. 6 are drawings for explaining a manufacturing method of a plastic composite material panel according to an embodiment of the present invention.
Figure 6:
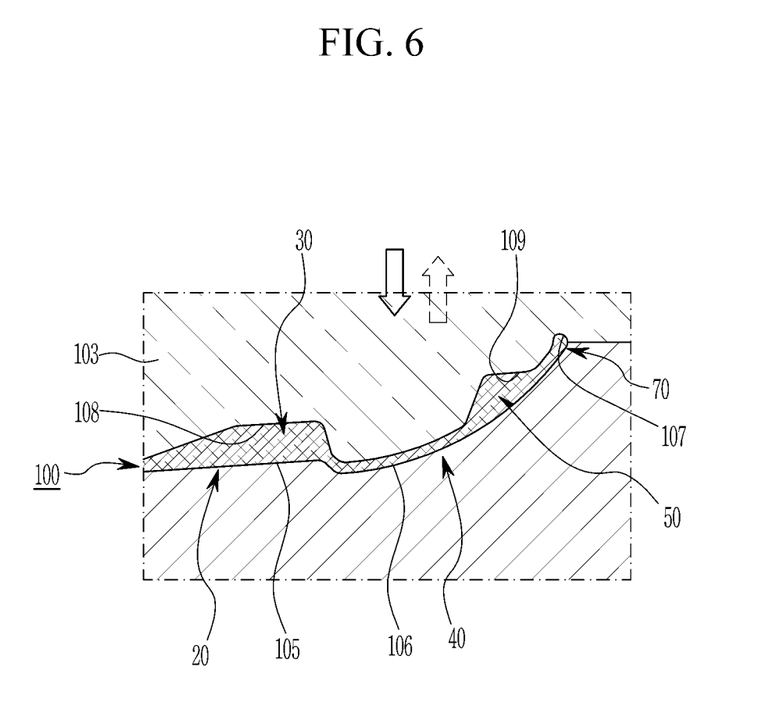

FIG. 5 and FIG. 6 are drawings for explaining a manufacturing method of the plastic composite material panel according to the embodiment of the present invention.

Referring to FIG. 5, a gel type of plastic composite material 101 made of a fiber material is provided. Then, a mold 104 including a fixed die 102 and a movable die 103 is provided.

The gel type of plastic composite material 101 is loaded onto the fixed die 102. In this case, the movable die 103 is in a state of being moved upward in relation to the fixed die 102.

The fixed die 102 includes a first molding surface 105 configured to mold the roof plate portion 20 and a second molding surface 106 configured to mold the roof extension portion 40.

Next, as shown in FIG. 5 and FIG. 6, the movable die 103 is downwardly moved. Accordingly, the movable die 103 is combined with the fixed die 102, so the gel type of plastic composite material 101 is pressed.

The movable die 103 includes a first molding groove 107 configured to mold the first material filling portion 70, a second molding groove 108 configured to mold the second material filling portion 30, and a third molding groove 109 configured to mold the third material filling portion 50. Here, each of the first molding groove 107, the second molding groove 108, and the third molding groove 109 is formed along the vertical direction.

Accordingly, the mold 104 may mold the plastic composite material panel 100 in which the roof plate portion 20 including the second material filling portion 30 and the roof extension portion 40 including the first material filling portion 70 and the third material filling portion 50 are integrally formed.

In the state in which the plastic composite material panel 100 according to the embodiment of the present invention is molded as described above, the movable die 103 is upwardly moved, and is released from the fixed die 102.

Accordingly, the plastic composite material panel 100 according to the embodiment of the present invention may be taken out from the fixed die 102 along the upper direction.

Here, since no undercut is formed in the plastic composite material panel 100 by the first material filling portion 70, the plastic composite material panel 100 may be smoothly taken out from the mold 104.

Figure 7:
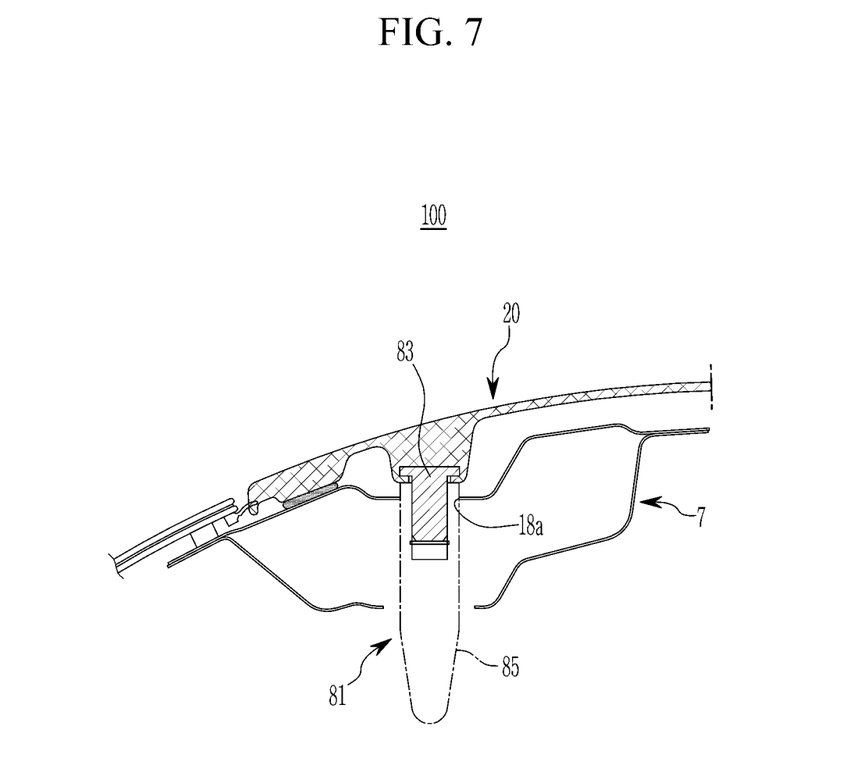
FIG. 7 illustrates a cross-sectional view taken along line C-C of FIG. 1 illustrating an assembly structure of a plastic composite material panel according to an embodiment of the present invention.
Figure 8:
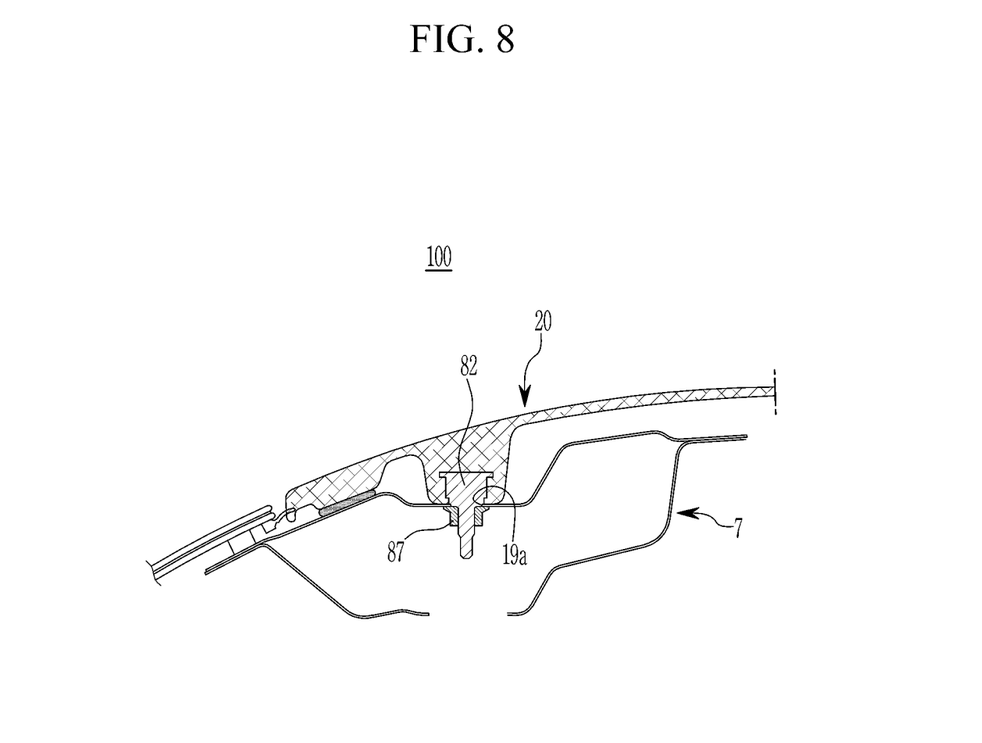
FIG. 8 illustrates a cross-sectional view taken along line D-D of FIG. 1 illustrating an assembly structure of a plastic composite material panel according to an embodiment of the present invention.

FIG. 7 illustrates a cross-sectional view taken along line C-C of FIG. 1 illustrating the assembly structure of the plastic composite material panel according to the embodiment of the present invention, and FIG. 8 illustrates a cross-sectional view taken along line D-D of FIG. 1 illustrating the assembly structure of the plastic composite material panel according to the embodiment of the present invention.

Referring to FIG. 7 and FIG. 8, the plastic composite material panel 100 according to the embodiment of the present invention includes at least one first position determining pin 81 and at least one first insert bolt 82 provided under a front edge of the roof plate portion 20.

The at least one first position determining pin 81 is configured to correctly position the front portion of the plastic composite material panel 100 according to the embodiment of the present invention to the vehicle body frame 7. The at least one first position determining pin 81 may be vertically inserted into a first reference hole 18*a* formed in the vehicle body frame 7.

For example, the at least one first position determining pin 81 includes a first shank 83 fixed to a lower portion of the front edge of the roof plate portion 20, and a first pin rod 85 coupled to the first shank 83.

Here, the first pin rod 85 may be detached from the first shank 83 while being inserted into the first reference hole 18*a*.

In addition, the at least one first insert bolt 82 may be fixed to the lower portion of the front edge of the roof plate portion 20, and may be fastened in a first fastening hole 19*a* formed in the vehicle body frame 7.

Here, the at least one first insert bolt 82 may be inserted into the first fastening hole 19*a*, and may be fastened to the vehicle body frame 7 by a nut 87.

Figure 9:
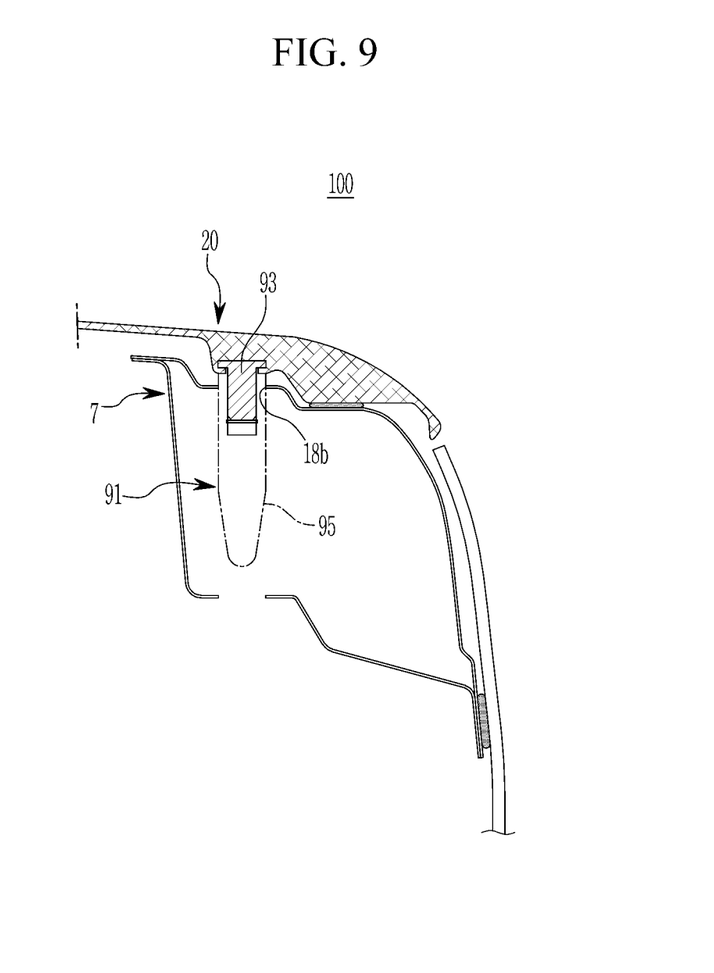
FIG. 9 illustrates a cross-sectional view taken along line E-E of FIG. 1 illustrating an assembly structure of a plastic composite material panel according to an embodiment of the present invention.
Figure 10:
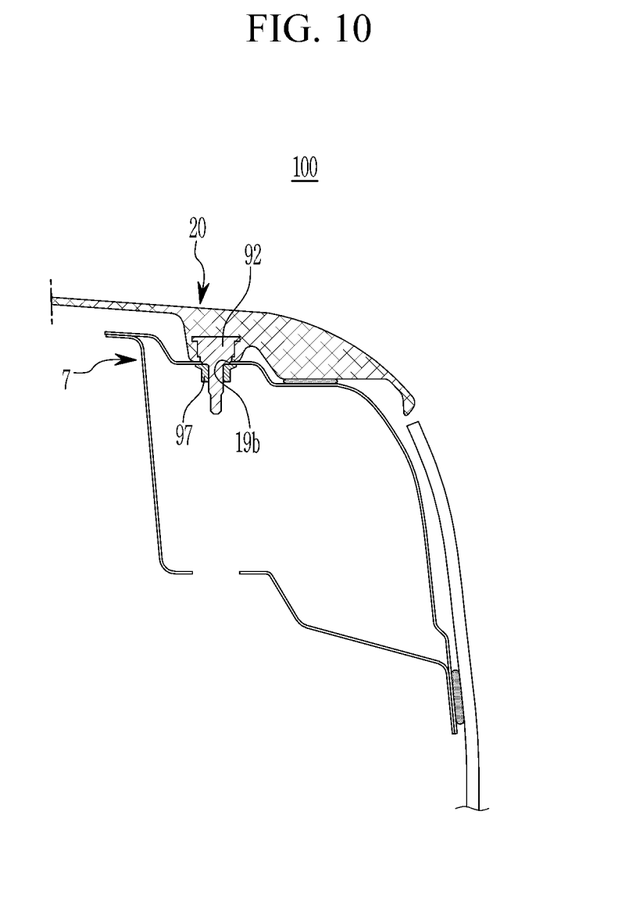
FIG. 10 illustrates a cross-sectional view taken along line F-F of FIG. 1 illustrating an assembly structure of a plastic composite material panel according to an embodiment of the present invention.

FIG. 9 illustrates a cross-sectional view taken along line E-E of FIG. 1 illustrating the assembly structure of the plastic composite material panel according to the embodiment of the present invention, and FIG. 10 illustrates a cross-sectional view taken along line F-F of FIG. 1 illustrating the assembly structure of the plastic composite material panel according to the embodiment of the present invention.

Referring to FIG. 9 and FIG. 10, the plastic composite material panel 100 according to the embodiment of the present invention includes at least one second position determining pin 91 and at least one second insert bolt 92 provided under a rear edge of the roof plate portion 20.

The at least one second position determining pin 91 is configured to correctly position the rear portion of the plastic composite material panel 100 according to the embodiment of the present invention to the vehicle body frame 7. The at least one second position determining pin 91 may be vertically inserted into a second reference hole 18*b* formed in the vehicle body frame 7.

For example, the at least one second position determining pin 91 includes a second shank 93 fixed to a lower portion of the rear edge of the roof plate portion 20, and a second pin rod 95 coupled to the second shank 93.

Here, the second pin rod 95 may be detached from the second shank 93 while being inserted into the second reference hole 18*b*.

In addition, the at least one second insert bolt 92 may be fixed to the lower portion of the rear edge of the roof plate portion 20, and may be fastened in a second fastening hole 19*b* formed in the vehicle body frame 7.

Here, the at least one second insert bolt 92 may be inserted into the second fastening hole 19*b*, and may be fastened to the vehicle body frame 7 by a nut 97.

The plastic composite material panel 100 according to the embodiment of the present invention as described so far includes the roof plate portion 20, the roof extension portion 40, and the first material filling portion 70.

Therefore, according to the embodiments of the present invention, it is possible to minimize the application portions of a plurality of outer panels of the plastic composite material assembled to the side assembly of the vehicle body frame 7. Therefore, according to the embodiments of the present invention, it is possible to realize the cost reduction and the simplification of the assembly process.

Furthermore, according to the embodiments of the present invention, in the manufacturing process of the plastic composite material panel 100, it is possible to easily take out the plastic composite material panel 100 from the mold 104. Therefore, according to the embodiments of the present invention, it is possible to improve the moldability of the plastic composite material panel 100.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A plastic composite material panel, comprising:
a roof plate portion adhesively bonded to a first bonding portion provided in a vehicle body frame;
a roof extension portion that extends from an edge of the roof plate portion, the roof extension portion to be adhesively bonded to a second bonding portion provided in the vehicle body frame; and
a first material filling portion formed at an end of the roof extension portion;
wherein the roof plate portion includes a second material filling portion formed under the edge thereof and bonded to the first bonding portion through an adhesive;
wherein the roof extension portion includes a third material filling portion formed under an edge thereof and adhesively bonded to the second bonding portion; and
wherein the roof extension portion further includes a vehicle body seating portion formed between the second material filling portion and the third material filling portion with a smaller thickness than that of the second material filling portion and the third material filling portion.

2. The plastic composite material panel of claim 1, wherein the roof extension portion extends from both side edges of the roof plate portion in a front-rear direction of a vehicle body to a side of the vehicle body frame.

3. The plastic composite material panel of claim 1, wherein the first material filling portion is provided to have a shape having a cross-sectional width being gradually decreased from an upper side to a lower side.

4. The plastic composite material panel of claim 1, wherein the second material filling portion is bonded to the first bonding portion provided a roof side or a side outer panel of a steel material of the vehicle body frame.

5. The plastic composite material panel of claim 1, wherein thicknesses of the second material filling portion and the third material filling portion are greater than a thickness of the vehicle body seating portion, and are determined according to heights of the first bonding portion and the second bonding portion.

6. The plastic composite material panel of claim 1, wherein the vehicle body seating portion overlies a protrusion portion protruding upward from the vehicle body frame.

7. The plastic composite material panel of claim 1, wherein the third material filling portion is bonded to the second bonding portion provided on a side outer panel of a steel material or a side outer panel of plastic composite material, the side outer panel coupled to a roof side of the vehicle body frame.

8. The plastic composite material panel of claim 1, further comprising a one position determining pin provided under a front edge or rear edge of the roof plate portion and vertically inserted into a reference hole formed in the vehicle body frame.

9. The plastic composite material panel of claim 8, further comprising an insert bolt provided under the front edge or rear edge of the roof plate portion and fastened to a fastening hole formed in the vehicle body frame.

10. A vehicle comprising:
a vehicle body frame that includes a first bonding portion and a second bonding portion;
a roof plate portion adhesively bonded to the first bonding portion;
a roof extension portion that extends from an edge of the roof plate portion, the roof extension portion adhesively bonded to the second bonding portion; and
a first material filling portion formed at an end of the roof extension portion;
wherein the roof plate portion includes a second material filling portion formed under an edge thereof and bonded to the first bonding portion through an adhesive;
wherein the roof extension portion includes a third material filling portion formed under an edge thereof and adhesively bonded to the second bonding portion; and
wherein the roof extension portion further includes a vehicle body seating portion formed between the second material filling portion and the third material filling portion with a smaller thickness than that of the second material filling portion and the third material filling portion.

11. The vehicle of claim 10, wherein the roof extension portion extends from both side edges of the roof plate portion in a front-rear direction of a vehicle body to a side of the vehicle body frame.

12. The vehicle of claim 10, wherein the first material filling portion is provided to have a shape having a cross-sectional width being gradually decreased from an upper side to a lower side.

13. The vehicle of claim 10, wherein the second material filling portion is bonded to the first bonding portion provided a roof side or a side outer panel of a steel material of the vehicle body frame.

14. The vehicle of claim 10, wherein the third material filling portion is bonded to the second bonding portion provided on a side outer panel of a steel material or a side outer panel of plastic composite material, the side outer panel coupled to a roof side of the vehicle body frame.

15. The vehicle of claim 10, further comprising a one position determining pin provided under a front edge or rear edge of the roof plate portion and vertically inserted into a reference hole formed in the vehicle body frame.

16. The vehicle of claim 15, further comprising an insert bolt provided under a front edge or rear edge of the roof plate portion and fastened to a fastening hole formed in the vehicle body frame.

17. A plastic composite material panel, comprising:
a roof plate portion to be adhesively bonded to a first bonding portion provided in a vehicle body frame;
a roof extension portion that extends from an edge of the roof plate portion, the roof extension portion to be adhesively bonded to a second bonding portion provided in the vehicle body frame; and a first material filling portion formed at an end of the roof extension portion;
wherein the roof plate portion includes a second material filling portion formed under an edge thereof and bonded to the first bonding portion through an adhesive;
wherein the roof extension portion includes a third material filling portion formed under an edge thereof and adhesively bonded to the second bonding portion;
wherein the roof extension portion further includes a vehicle body seating portion formed between the second material filling portion and the third material filling portion with a smaller thickness than that of the second material filling portion and the third material filling portion;
wherein the roof extension portion extends from both side edges of the roof plate portion in a front-rear direction of a vehicle body to a side of the vehicle body frame; and
wherein the first material filling portion is provided to have a shape having a cross-sectional width being gradually decreased from an upper side to a lower side.

18. The plastic composite material panel of claim 17, wherein thicknesses of the second material filling portion and the third material filling portion are greater than a thickness of the vehicle body seating portion, and are determined according to heights of the first bonding portion and the second bonding portion.

19. The plastic composite material panel of claim 17, wherein the vehicle body seating portion is seated on a protrusion portion protruding upward from the vehicle body frame.

20. The plastic composite material panel of claim 17, wherein the second material filling portion is bonded to the first bonding portion provided a roof side or a side outer panel of a steel material of the vehicle body frame.

* * * * *

UNITED STATES PATENT AND TRADEMARK OFFICE
CERTIFICATE OF CORRECTION

PATENT NO. : 12,312,008 B2
APPLICATION NO. : 17/957301
DATED : May 27, 2025
INVENTOR(S) : Kim et al.

Page 1 of 1

It is certified that error appears in the above-identified patent and that said Letters Patent is hereby corrected as shown below:

In the Claims

In Column 11, in Claim 1, Line 32, after "portion" delete "to be".

Signed and Sealed this
Fifteenth Day of July, 2025

Coke Morgan Stewart
*Acting Director of the United States Patent and Trademark Office*